United States Patent [19]

Herwig et al.

[11] 4,271,359
[45] Jun. 2, 1981

[54] OPTICAL ARRANGEMENT FOR A PASSIVE INFRARED MOTION DETECTOR

[75] Inventors: Thomas Herwig, Schlangenbad; Gerhard Doenges, Taunusstein, both of Fed. Rep. of Germany

[73] Assignee: Heimann GmbH, Fed. Rep. of Germany

[21] Appl. No.: 137,846

[22] Filed: Apr. 7, 1980

[30] Foreign Application Priority Data

Apr. 25, 1979 [DE] Fed. Rep. of Germany ....... 2916768

[51] Int. Cl.³ .............................................. G01J 1/00
[52] U.S. Cl. .................................. 250/347; 250/342
[58] Field of Search ............... 250/338, 342, 347, 353; 350/1.6, 301, 302; 340/567

[56] References Cited

U.S. PATENT DOCUMENTS

| | | | |
|---|---|---|---|
| 3,381,569 | 5/1968 | Hatcher | 250/347 |
| 3,524,180 | 8/1970 | Cruse | 340/567 |
| 3,703,718 | 11/1972 | Berman | 340/567 |
| 3,745,347 | 7/1973 | de Brey et al. | 250/347 |
| 3,927,254 | 12/1975 | Lessman | 250/347 |
| 4,070,573 | 1/1978 | Allen et al. | 250/347 |

Primary Examiner—Alfred E. Smith
Assistant Examiner—Janice A. Howell
Attorney, Agent, or Firm—Hill, Van Santen, Steadman, Chiara & Simpson

[57] ABSTRACT

An optical arrangement for use with an infrared detector characterized by a concave mirror surrounding the infrared detector, a body having a plane reflecting surface extending perpendicular to the axis of the detector, which surface faces the detector and the conical concave mirror, and having a conical reflecting surface extending from the plane surface, and at least one planar directional mirror pivotably mounted for reflecting infrared radiation at the conical reflecting surface. The arrangement can be used to monitor a space and if used with a second arrangement, whose directional mirrors are arranged to provide new sensing curtains adjacent the curtains of the first detector, the arrangement can determine the direction of movement of the object passing through the space.

6 Claims, 3 Drawing Figures

OPTICAL ARRANGEMENT FOR A PASSIVE INFRARED MOTION DETECTOR

BACKGROUND OF THE INVENTION

The present invention is directed to an optical arrangement for use with a passive infrared motion detector for monitoring a space. The optical arangement includes a concave mirror coacting with at least one directional mirror which will direct radiation from a field of vision onto the detector to create an effective curtain for monitoring at least a boundary of a space.

An optical arrangement, which has a directional mirror and at least one means for focusing the radiation from a directional mirror onto a detector, is disclosed in German A.S. No. 21 03 909, which is based on the parent application of the U.S. Pat. No. 3,703,718. For monitoring a space or for securing specific dihedral angles, one requires optical active walls as curtains, which secure surface like and which either completely separate the space or area to be secured from other spaces or areas or completely surround the space or areas. Not only in the monitoring spaces for the unauthorizing incursion of persons, but above all in securing mobile machine parts, for example, for the purpose of work security, a gap free screening is required. Light barriers cannot fulfill such a purpose. On the basis of infrared motion detectors, a possiblity is provided by the above mentioned U.S. patent for generating a conical-shaped optical active wall with special optics. This conical wall will enclose a conical shaped space and will enable monitoring of the space. Infrared radiation from the inherent volume of the wall will have its strength determined by the optical arrangement and is imaged onto an infrared detector. An electrical signal, which for example is employed for alarm purposes, is then formed from a rate of increase of the captured infrared radiation which is characteristic of a moving person. It is therefore not possible for a person to penetrate the conical shaped wall unnoticed and therefore to enter into the conical space.

For various purposes, it is desired not only to secure spaces with different geometrical shapes but to also make it possible for variable shaping of the space to be secured for the user. Particularly for work security, a monitoring device which can be universely employed and is capable of being adapted to the respective place of employment is desired. Moreover, since the space normally has a rectangular outline, the conical shape is not particularly favorable for monitoring.

SUMMARY OF THE INVENTION

The present invention is directed to providing an optical arrangement for a infrared motion detector which arrangement enables universal utilization. In particular, the geometry of the space which is to be monitored can be adapted by the user to the greatest possible degree to meet his requirements.

In order to meet these requirements, the present invention provides an optical arrangement for a passive infrared motion detector for monitoring the space, said infrared motion detector including detector means for forming a signal from a characteristic change of the detected infrared radiation, said arrangement including mirror means for directing radiation from at least one field of vision onto the detector means, each field of vision forming an optical effective curtain to define at least a boundary of a space to be monitored, said mirror means including at least one planar directional mirror, a body with a shape of a conical frustum, and one concave mirror, said concave mirror being disposed to centrically surround the detector means in the same direction of view, said body being arranged opposite the detector means on the optical axis thereof with a planar mirror surface facing the detector means and extending in a plane perpendicular to the axis of said detector means, said body having a conical reflecting surface extending from said planar mirror surface and facing said concave mirror, each of the planar directional mirrors facing the conical reflecting surface of said body and being capable of being rotated about an edge facing away from the direction of view with respect to the optical axis of the concave mirror to change the position of the field of view.

One embodiment of the invention is characterized by the provision of four directional mirrors which are each mounted for rotation on an edge thereof to form a quadrangle around an optical axis of the concave mirror. Each of these directional mirrors will create an optically effective curtain coacting with the other curtains to surround the space being monitored.

With the assistance of this inventive optical arrangement particularly in the embodiment with the four directional mirrors, which do justice to most utilizations, a universally employable or usable motion detector is created. The space to be secured is limited by flat surfaces which in the closed case will form a pyramid. In the case of the four directional mirrors arranged at right angles with respect to one another, a pyramid with a rectangular base will be formed. This outline corresponds better to living and working spacings than the circular outline of the cone of the above mentioned prior art devices.

The arrangement of the present invention allows a securing by means of a simple planar curtain, which only separates two spaced areas from one another and also for example, completely secures a door or display windows.

In the area of work security, the inventive optical arrangement can be adapted to the respective place of employment. Depending on the shape of the space or the area to be secured, the user can adjust the optical arrangement. Temperature fluctuations in the region to be secured, which fluctuations are derived from moving machine parts, can be blanked out or blocked off from the detector.

According to an advantageous development of the optical arrangement, the arrangement will enable determining motion that causes triggering of the radiation change. This embodiment utilizes a second optical effective curtain to be formed within the first curtain by providing a second optical arrangement having a second mirror means and a second infrared detector. The directional mirrors of the second mirror means will be positioned at a smaller angle with respect to the optical axis of the first directional mirrors so that a curtain will extend within the previously formed detecting curtain.

Thus, one can determine the direction in which a person moving in the monitor space passes through the optically effective walls. Thus, whether the person is entering or leaving the space can be determined.

In order to achieve a short overall length for the entire optical arrangement, it is desireable that the detector, concave mirror and second body having the shape of a conical frustum, which are part of the second arrangement lie on the optical axis of the first mirror means and are inverted relative thereto.

DESCRIPTION OF THE PREFERRED EMBODIMENTS

The principles of the present invention are particularly useful in an optical arrangement generally indicated at 20 for use with a passive infrared motion detector for monitoring a space. As illustrated, the infrared motion detector includes detector means 1 for receiving the radiation and for forming a signal from a characteristic change of the detected infrared radiation.

Figure 2:
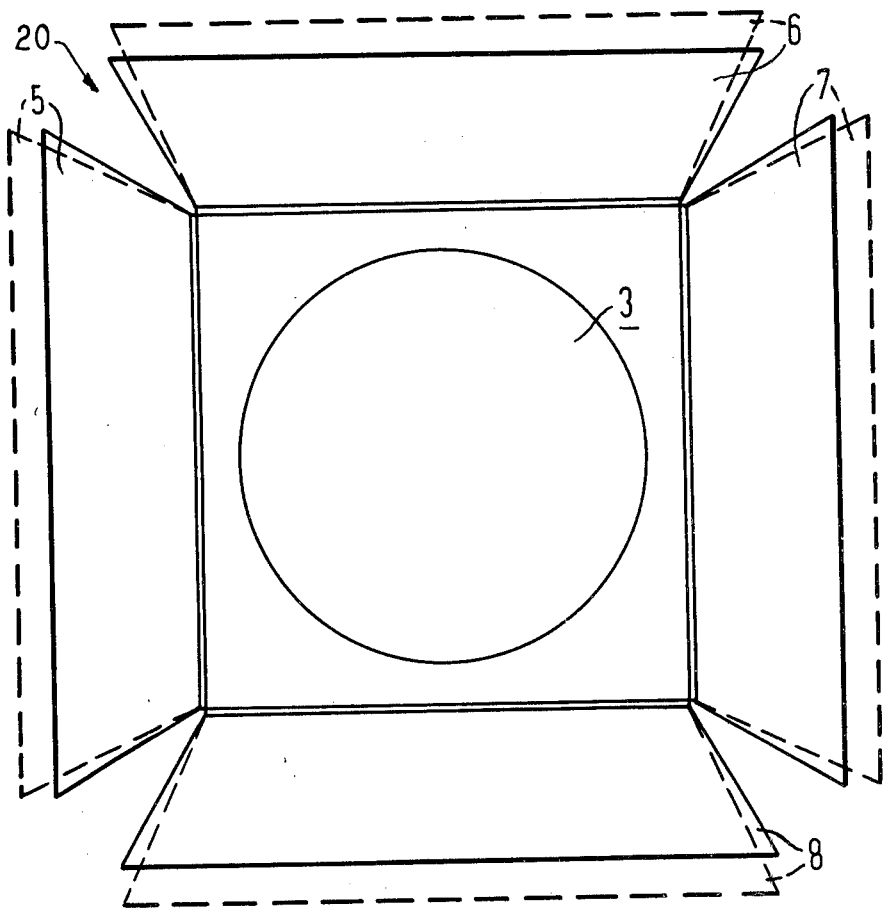
FIG. 2 is a plan view taken from the direction of the monitored space of the arrangement of the present invention.

The optical arrangement 20 includes mirror means which is formed by a concave mirror 2, a body 3, which has a shape of a conical frustum and at least one directional mirror such as the four directional mirrors 5, 6, 7 and 8 (FIG. 2). The conical mirror is a spherical mirror and is arranged centrally around the detector 1 so that the axis of the mirror 2 and the detector 1 conicide. The body 3 lies on the axis of the conical mirror 2 and the detector 1 and has a planar surface 4, which is the smaller of the two planar surfaces lying in a plane extending perpendicular to the axis. The surface 4 is a mirrored or reflecting surface.

Figure 1:
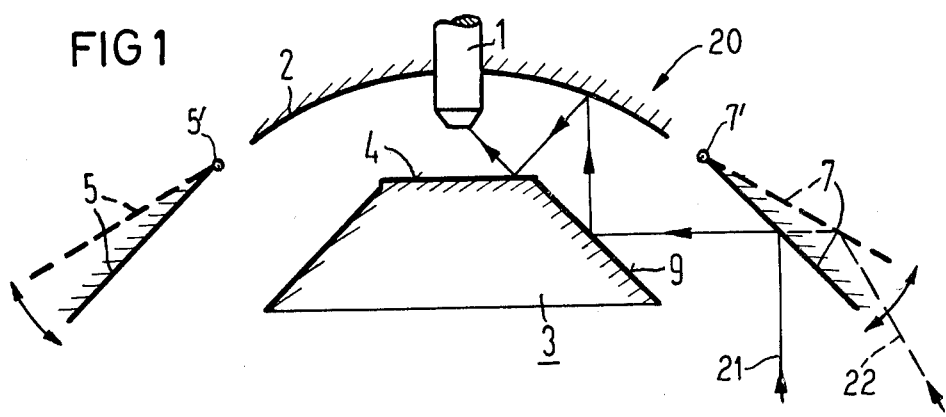
FIG. 1 is a cross sectional view to schematically illustrate the optical arrangement of the present invention.

Each of the four directional mirrors 5, 6, 7 and 8 are rectangular directional mirrors and are mounted adjacent the edge of the concave mirror 2 by a pivotable mounting which enables the mirrors such as 5 and 7 to pivot about an edge 5′,7′ as illustrated in FIG. 1. Thus, by the provision of the four directional mirrors 5, 6, 7 and 8, the concave mirror 2 is extended at the edges by means of a pyramidal frustum shaped inside mirror with a quadratic cross section whose angle of aperture is variable. The body 3 has a conical surface 9 which is provided with a mirrored or reflecting surface and thus is a conical convex mirror.

As illustrated in FIG. 2, which provides a plan view of the optical arrangement 20, one can see that the conical frustum shaped body 3 with the conical frustum shaped mirror has its larger planar surface extending in the direction from which the monitoring is to be taken. In both FIGS. 1 and 2, the mounting which enables rotation of each of the directional mirrors 5, 6, 7 and 8 on an edge is indicated by showing one position in bold lines and a second position in broken lines.

Assuming that the arrangement 20 is mounted on a ceiling of a space or room to be monitored and assuming that each of the directional mirrors 5, 6, 7 and 8 are in the position illustrated in bold lines, radiation extending in a vertical plane or direction as indicated by the line 21 will strike the center of the directional mirror 7 and is reflected from there onto the conical convex mirror 9. From the mirror 9, the radiation will be reflected to the concave mirror 2 which then focuses and reflects the radiation onto the mirror 4 of the body 3 from where it will be reflected or directed at the infrared detector 1. This mirror system forms a Cassegrain optics with a very low overall length and a good bundling of the properties. The perpendicular incident beam 21 is representive for beams which impinge on the directional mirror 7 from a wall or curtain like plane which extends perpendicular to the plane of FIG. 1 along the beam 21. In other words, this means that the column-shaped space with a quadratic cross section and perpendicular type walls will be surrounded below the directional mirrors by a wall whose radiation is determined or detected by the detector 1.

If the mirrors are moved to the second position shown in broken lines, a greater angle of the aperture is then produced and causes an expansion of a column-shaped space to form a quadratic pyramid with oblique walls. Thus, the curtain or wall will be parallel to the beam 22 shown in broken lines in FIG. 1.

A single directional mirror would produce a single wall or curtain which is employable as a securing curtain for example for a display window or door. The pyramid can be shaped as desired by means of different aperture angles of the directional mirrors 5, 6, 7 and 8. Individual sectors can be blanked out or blocked off by means of covering corresponding locations of the convex conical mirror 9 and/or selected portions of the directional mirrors 5-8. By so doing, an optical adaptation is possible and, in particular, an adaptation to the requirements for the work security that is desired for example to admit an unimpeded access from one specific side.

Figure 3:
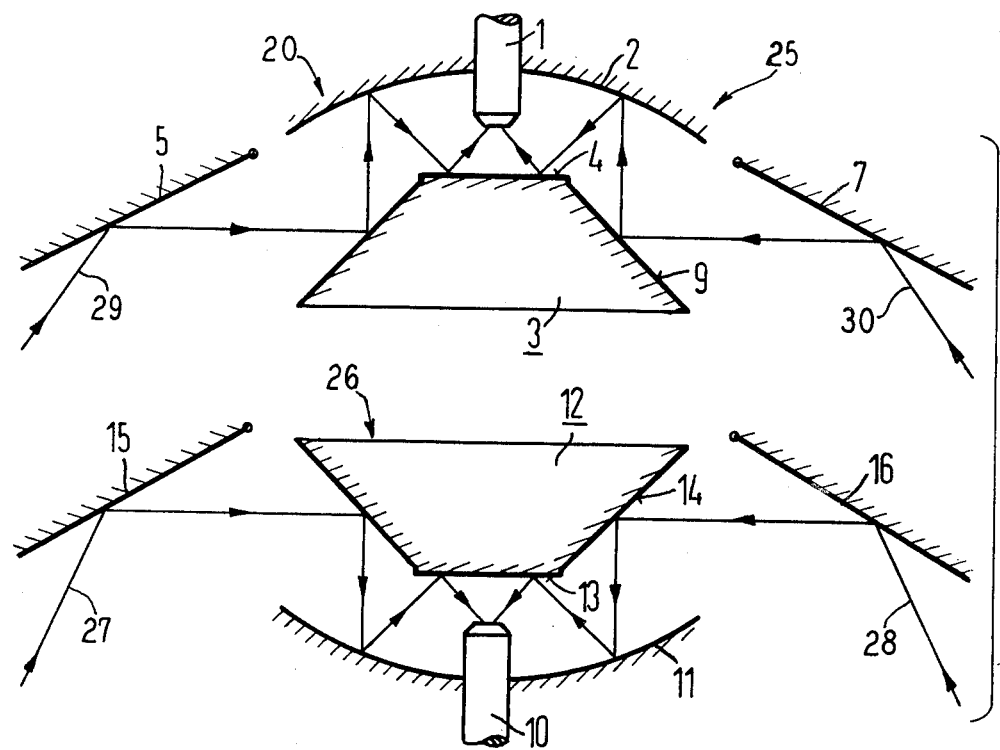
FIG. 3 is a cross sectional view of the optical arrangement which enables determining the direction of movement of a body penetrating the space.

An embodiment, which generally indicated at 25 in FIG. 3, includes the first embodiment 20 discussed with regard to FIGS. 1 and 2, a further second optical arrangement which is generally indicated at 26. As illustrated, the second optical arrangement 26 is positioned in front of the optical arrangement 20 in the direction of viewing.

The second optical arrangement 26 includes a second infrared detector means 10 which is centrically located in a second concave mirror 11 of a second mirror means. A second body 12 is positioned to lie on the axis of the detector 10 and the mirror 11 and has a small planar surface 13 that is a reflecting or mirrored surface that extends perpendicular to the axis of the detector 10 and faces the detector. As with the body 3, the body 12 has a conical portion which is provided with reflecting surface to form a convex conical reflecting surface 14 which is facing the concave mirror 11. It should be noted that the concave mirror 11 is facing the concave mirror 2 and thus the body 12 and the mirror 11 and the detector 10 all lie mirror-inverted on the optical axis of the opposite arrangement of the detector 1, concave mirror 2 and body 3.

The second arrangement 26 also has directional mirrors such as 15 and 16 which are arranged to receive beams 27 and 28 which come almost from the same direction as beams 29 and 30 which strike the respected reflectors 5 and 7 of the first arrangement 20. It should be noted that preferably four directional mirrors are utilized although only two are illustrated. The directional mirrors 15 and 16 will reflect the radiation coming along a given directions such as 27 and 28 onto the mirrored surface 14 which in turn will reflect onto the concave mirror 11 which will then reflect the beams onto the flat mirror surface 13 of the body 12. From the mirror surface 13, the radiation is detected by the detector 10. The mirror such as 15 and 16 will pick up a planar amount of radiation which comes from a plane substantially parallel to the plane of radiation detected by the mirror such as 5 and 7 and thus form a double curtain. It should be noted that the mirrors such as 15 and 16 are placed somewhat narrower in their aperture angle so that their planes 27 and 28 lie within the planes 29 and 30 of the mirror of the arrangement 20. Thus, the space monitored by the arrangement 20 will also be monitored by the arrangement 26 with the second curtains or walls being within the walls of the first device 20. Thus, the monitored space is covered by two pyramid walls lying inside one another.

If a person or in general a body, which emits infrared radiation and its radiation contrast with the ambient radiation, moves through the pyramid walls, the motion direction of the body can be covered from the temporal sequence of the electrical signals created by the detectors 1 and 10. Mainly the arrangement 25 will enable determining whether the body is moving into the secured space or moving out of it. The speed of movement can also be determined in addition to the direction of movement. Such an arrangement will facilitate recognizing the characteristic motions and assist in reducing false alarms from the device or arrangement.

Although various minor modifications may be suggested by those versed in the art, it should be understood that we wish to embody within the scope of the patent granted hereon, all such modifications as reasonably and properly come within the scope of our contribution to the art.

We claim:

1. An optical arrangement for a passive infrared motion detector for monitoring a space, said infrared motion detector including detector means for forming a signal from a characteristic change of the detected infrared radiation, said arrangement including mirror means for directing radiation from at least one field of vision onto the detector means, each field of vision forming an optically effective curtain to define at least a boundary of a space to be monitored, said mirror means including at least one planar directional mirror, a body with the shape of a conical frustum, and one concave mirror, said concave mirror being disposed to centrically surround the detector means in the same direction of view, said body being arranged opposite the detector means on the optical axis thereof with a planar mirror surface facing the detector means and extending in a plane perpendicular to the axis of said detector means, said body having a conical reflecting surface extending from said planar mirror surface and facing said concave mirror, each of the planar directional mirrors facing the conical reflecting surface of said body, and being capable of being rotated about an edge facing away from the direction of view with respect to the optical axis of the concave mirror to change the position of the field of view.

2. An optical arrangement according to claim 1, wherein four directional mirrors are provided, each of said four mirrors being mounted for rotation on an edge thereof to form a quadrangle around the optical axis of the concave mirror, each of said mirrors creating an optical effective curtain coacting to surround the space being mounted.

3. An optical arrangement according to claim 2, which includes second detector means for detecting infrared radiation and second mirror means associated with the second detector means, said second detector means and mirror means being arranged relative to the first mentioned mirror means and detector means to form a second optically effective curtain adjacent to the first mentioned curtain, said second mirror means including an adjustable directional mirrors being arranged at a smaller angle with respect to the optical axis of the directional mirrors of the first arrangement so that the optical curtains of the field of view of the second mirror means are within the boundaries of said first arrangement.

4. An optical arrangement according to claim 3, wherein the second mirror means includes a concave mirror and a second body having the shape of a conical frustum, said body having a mirrored plane surface extending perpendicular to the axis of the second detector means and a conical mirror surface for directing reflections from the directional mirrors onto the concave mirror, said second concave mirror, body and detector means being arranged on the optical axis of the first mirror means.

5. An optical arrangement according to claim 1, which includes a second detector means for detecting infrared radiation, a second mirror means associated with the second detector means, said second detector means and mirror means being arranged relative to the first mentioned mirror means and detector means to form a second optically effective curtain adjacent to the first mentioned curtain, said second mirror means including adjustable directional mirrors being arranged at a smaller angle with respect to the optical axis of the first mirror means so that the optical curtains of the field of view of the second mirror means are within the boundaries of said field of view of the first mirror means.

6. An optical arrangement according to claim 5, wherein the second mirror means includes a concave mirror and a second body having the shape of a conical frustum, said second body having a mirrored plane surface extending perpendicular to the axis of the second detector means and a conical mirror surface for directing reflections from the directional mirrors onto the concave mirror, said second concave mirror, second body and the second detector means being arranged on the optical axis of the first mirror means.

* * * * *